United States Patent
Graham-Cumming

(10) Patent No.: US 10,798,203 B2
(45) Date of Patent: *Oct. 6, 2020

(54) METHOD AND APPARATUS FOR REDUCING NETWORK RESOURCE TRANSMISSION SIZE USING DELTA COMPRESSION

(71) Applicant: CLOUDFLARE, INC., San Francisco, CA (US)

(72) Inventor: John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,747

(22) Filed: Jun. 17, 2019

(65) Prior Publication Data
US 2019/0306263 A1    Oct. 3, 2019

Related U.S. Application Data

(63) Continuation of application No. 16/172,651, filed on Oct. 26, 2018, now Pat. No. 10,326,853, which is a (Continued)

(51) Int. Cl.
*H04L 29/08*     (2006.01)
*H04L 29/06*     (2006.01)

(52) U.S. Cl.
CPC .... *H04L 67/2828* (2013.01); *H04L 29/08783* (2013.01); *H04L 67/1023* (2013.01);
(Continued)

(58) Field of Classification Search
None
See application file for complete search history.

(56) References Cited

U.S. PATENT DOCUMENTS 5,931,904 A    8/1999  Banga et al.
6,178,461 B1*  1/2001  Chan .................. H04L 67/2823
                                              709/247
(Continued)

OTHER PUBLICATIONS

Fielding R., et al., "Hypertext Transfer Protocol (HTTP/1.1): Caching," Internet Engineering Task Force (IETF), Request for Comments: 7234, Jun. 2014, pp. 1-43.
(Continued)

*Primary Examiner* — Philip J Chea
*Assistant Examiner* — Hassan A Khan
(74) *Attorney, Agent, or Firm* — Nicholson De Vos Webster & Elliott LLP

(57) ABSTRACT

A method and computing device for delta compression techniques for reducing network resource transmission size are described. A first request for a network resource is received. The requested network resource is retrieved. A first response including the network resource is transmitted to the near end network optimizer. The retrieved network resource is stored as a first version of the network resource regardless of a directive that a cached version of the network resource is not to be used to respond to future HTTP requests for that network resource without successful revalidation with an origin server. A second request for the network resource is received. A most current version of the network resource is retrieved. A set of differences between the first version and the most current version of the network resource are determined. The set of differences are transmitted to the near end network optimizer.

18 Claims, 10 Drawing Sheets

Related U.S. Application Data continuation of application No. 16/002,401, filed on Jun. 7, 2018, now Pat. No. 10,142,434, which is a continuation of application No. 15/656,928, filed on Jul. 21, 2017, now Pat. No. 10,021,206, which is a continuation of application No. 14/659,909, filed on Mar. 17, 2015, now Pat. No. 9,729,657, which is a continuation of application No. 13/440,658, filed on Apr. 5, 2012, now Pat. No. 8,984,166.

(52) U.S. Cl.
CPC ...... *H04L 67/2842* (2013.01); *H04L 67/2876* (2013.01); *H04L 69/02* (2013.01); *H04L 69/04* (2013.01)

(56) References Cited

U.S. PATENT DOCUMENTS

| | | | |
|---|---|---|---|
| 6,240,447 | B1 | 5/2001 | Banga et al. |
| 6,976,090 | B2 | 12/2005 | Ben-Shaul et al. |
| 7,761,535 | B2 | 7/2010 | Huang et al. |
| 7,877,517 | B2 | 1/2011 | Mega et al. |
| 7,975,071 | B2 | 7/2011 | Ramjee et al. |
| 8,285,808 | B1 | 10/2012 | Joel et al. |
| 8,327,128 | B1 | 12/2012 | Prince et al. |
| 8,370,940 | B2 | 2/2013 | Holloway et al. |
| 8,438,240 | B2 | 5/2013 | Prince et al. |
| 8,468,247 | B1 | 6/2013 | Richardson et al. |
| 8,984,166 | B2 | 3/2015 | Graham-Cumming et al. |
| 9,003,035 | B1 | 4/2015 | Richardson et al. |
| 2002/0010798 | A1* | 1/2002 | Ben-Shaul .......... H04L 67/1021 709/247 |
| 2003/0159136 | A1* | 8/2003 | Huang ................ G06F 16/275 717/171 |
| 2004/0205208 | A1 | 10/2004 | Koponen et al. |
| 2005/0144200 | A1* | 6/2005 | Hesselink ............. H04L 63/029 |
| 2006/0168118 | A1* | 7/2006 | Godlin ............... G06F 16/1767 709/218 |
| 2007/0174428 | A1 | 7/2007 | Lev Ran et al. |
| 2008/0267284 | A1 | 10/2008 | Tsubaki |
| 2010/0125673 | A1 | 5/2010 | Richardson et al. |
| 2010/0169392 | A1 | 7/2010 | Lev Ran et al. |
| 2016/0205221 | A1* | 7/2016 | Gero ................ H04L 29/08792 709/247 |

OTHER PUBLICATIONS

Final Office Action, U.S. Appl. No. 16/025,903, dated Mar. 18, 2020, 15 pages.
Final Office Action, U.S. Appl. No. 16/057,722, dated Mar. 19, 2020, 13 pages.
Maheshwari, Ritesh, "TCP over IP Anycast—Pipe dream or Reality?," Linked In Engineering, retrieved from the Internet: https://engineering.linkedin.com/network-performance/tcp-over-ip-anycast-pipe-dream-or-reality, Sep. 9, 2015, 7 pages.
Non-Final Office Action, U.S. Appl. No. 16/025,903, dated Oct. 7, 2019, 16 pages.
Non-Final Office Action, U.S. Appl. No. 16/057,722, dated Oct. 2, 2019, 19 pages.
Advisory Action from U.S. Appl. No. 13/440,658, dated May 3, 2013, 2 pages.
Banga, et al., Optimistic Deltas for WWW Latency Reduction, 1997 USENIX Technical Conference, 15 pages.
Butler J., et al., "A Proposal for Shared Dictionary Compression over HTTP," Google, Inc., 2008, 18 pages.
Final Office Action from U.S. Appl. No. 13/440,658, dated Apr. 29, 2014, 16 pages.
Final Office Action from U.S. Appl. No. 13/440,658, dated Feb. 26, 2013, 9 pages.
Final Office Action from U.S. Appl. No. 15/233,157, dated Feb. 2, 2018, 24 pages.
Final Office Action from U.S. Appl. No. 15/233,157, dated May 12, 2017, 13 pages.
International Preliminary Report on Patentability for U.S. Appl. No. PCT/US2013/035501, dated Oct. 7, 2014, 6 pages.
International Search Report and Written Opinion for U.S. Appl. No. PCT/US2013/035501, dated Apr. 23, 2013, 13 Pages.
Korn D., et al., "The VCDIFF Generic Differencing and Compression Data Format," Network Working Group, Request for Comments: 3284, 2002, pp. 1-29.
Mogul J., et al., "Delta encoding in HTTP," Network Working Group, Request for Comments: 3229, 2002, pp. 1-49.
Mogul J.C., "WRL Research Report 97/4a, Potential benefits of delta encoding and data compression for HTTP (Corrected version)," 1997, 60 pages.
Muthitacharoen A., et al., "A Low-Bandwidth Network File System," 2001, pp. 174-187.
Non-Final Office Action for U.S. Appl. No. 15/233,157, dated Nov. 16, 2016, 21 pages.
Non-Final Office Action from U.S. Appl. No. 13/440,658, dated Jan. 14, 2014, 12 pages.
Non-Final Office Action from U.S. Appl. No. 13/440,658, dated May 29, 2012, 11 pages.
Non-Final Office Action from U.S. Appl. No. 13/440,658, dated Oct. 9, 2012, 8 pages.
Non-Final Office Action from U.S. Appl. No. 13/440,658, dated Sep. 11, 2013, 16 pages.
Non-Final Office Action from U.S. Appl. No. 15/233,157, dated Sep. 13, 2017, 19 pages.
Notice of Allowance from U.S. Appl. No. 16/172,651, dated Feb. 4, 2019, 25 pages.
Notice of Allowance from U.S. Appl. No. 13/440,658, dated Oct. 22, 2014, 5 pages.
Notice of Allowance from U.S. Appl. No. 14/659,909, dated Apr. 7, 2017, 27 pages.
Notice of Allowance from U.S. Appl. No. 15/233,157, dated Apr. 16, 2018, 11 pages.
Notice of Allowance from U.S. Appl. No. 15/656,928, dated Mar. 7, 2018, 17 pages.
Notice of Allowance from U.S. Appl. No. 16/002,401, dated Jul. 23, 2018, 17 pages.
Restriction Requirement from U.S. Appl. No. 15/233,157, dated Oct. 24, 2016, 6 pages.

\* cited by examiner

METHOD AND APPARATUS FOR REDUCING NETWORK RESOURCE TRANSMISSION SIZE USING DELTA COMPRESSION

CROSS-REFERENCE TO RELATED APPLICATIONS

This application is a continuation of U.S. application Ser. No. 16/172,651, filed Oct. 26, 2018, which is a continuation of U.S. application Ser. No. 16/002,401, filed Jun. 7, 2018 (now U.S. Pat. No. 10,142,434 issued Nov. 27, 2018), which is a continuation of Ser. No. 15/656,928, filed Jul. 21, 2017 (now U.S. Pat. No. 10,021,206 issued Jul. 10, 2018), which is a continuation of U.S. application Ser. No. 14/659,909, filed Mar. 17, 2015 (now U.S. Pat. No. 9,729,657 issued Aug. 8, 2017), which is a continuation of U.S. application Ser. No. 13/440,658, filed Apr. 5, 2012 (now U.S. Pat. No. 8,984,166 issued Mar. 17, 2015), which are hereby incorporated by reference.

TECHNICAL FIELD

Embodiments of the invention relate to the field of networking; and more specifically, to reducing network resource transmission size using delta compression.

BACKGROUND ART

Network resources are commonly requested and retrieved using the Hypertext Transport Protocol (HTTP). A common approach to improving performance is caching network resources closer to the clients (often in several different data centers are differently geographically located). For example, content delivery networks (CDNs) are commonly used to cache resources such as static resources (e.g., resources that change infrequently such as images, videos, etc.) closer to clients.

Resources that frequently change (e.g., web sites for news, sports, etc.) may not be cached since the cached version may quickly become stale. Also, other types of resources may not be cached. As an example, HTTP includes a Cache-Control header field that is used to control the caching mechanisms along the request/response chain. The Cache-Control header field includes a "no-cache" directive that can be set by an origin server to specify that a cached version of the resource is not to be used to respond to a request without successful revalidation with the origin server.

To decrease the size of transmissions of resources, whether from a cache server or from an origin server, compression is typically used. For example, gzip is a common compression algorithm used to send compressed HTTP responses to clients.

Delta encoding in HTTP has been proposed in RFC 3229, "Delta encoding in HTTP", January 2002, as a way to reduce the size of resource transmission between an origin server and the client. The delta encoding proposal described in RFC 3229 recognizes that if a web resource changes, the new version is often similar to the older version. RFC 3229 proposes that the difference between the versions be sent to the client (e.g., the browser on a client computing device such as a desktop computer, notebook, tablet, smartphone, etc.), and the client applies the delta to construct the new version. The approach described in RFC 3229 has not been widely adopted because in order to be effective for a resource that changes often, the origin server would have to store many versions of the website (e.g., an extreme would be a single version for each single client).

Another proposal for compression is the use of a shared dictionary compression over HTTP. In the shared dictionary compression, the client and server agree on a set of predefined elements that will be the same across the resources (referred to as cross-payload redundancy). For example, the header, footer, and/or other elements of the resource may be the same. With this proposal, the shared dictionary is downloaded to the client that contains strings that are likely to appear in subsequent HTTP responses. The server can then substitute those elements with a reference to the dictionary when sending the HTTP response and the client can use its dictionary to reconstruct the resource, thereby reducing the payload of the transmission. This approach has not been widely adopted in part because it is administratively difficult to maintain the dictionaries. For example, if a website is changed (e.g., it is redesigned), the references in the dictionary will likely need to be changed and disseminated to the clients. In addition, this approach requires support on the client devices.

SUMMARY OF THE INVENTION

A near end network optimizer receives, from a client device, a request for a network resource. Responsive to determining that a version of the network resource is stored in the near end network optimizer, a request for the network resource is transmitted to a far end network optimizer along with a version identifier that identifies that version. The near end network optimizer receives, from the far end network optimizer, a response that includes a differences file that specifies the difference(s) between the version of the network resource stored in the near end network optimizer with a most current version of the network resource. The response does not include the entire network resource. The near end network optimizer applies the specified difference(s) to the version that it has stored to generate an updated version of the network resource, and transmits the updated version of the network resource to the client device.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
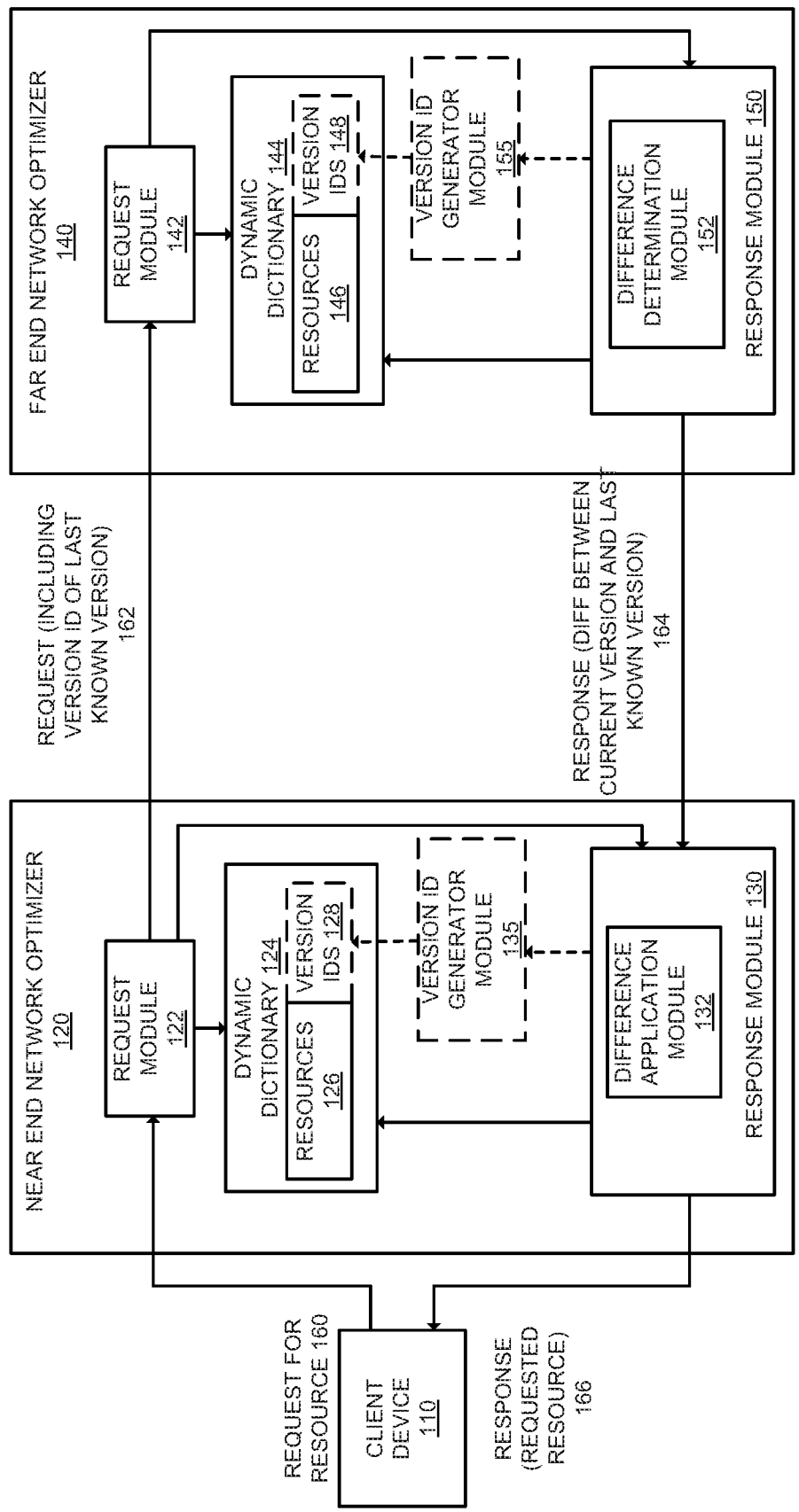
FIG. 1 illustrates an exemplary system for reducing network resource transmission size using delta compression according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for reducing network resource transmission size using delta compression is described. The techniques described herein reduce the network resource transmission size between at least two endpoints between client devices and origin servers. A first endpoint, which is referred herein as a near end network optimizer, is coupled with client devices and may be incorporated into a proxy server that receives requests (e.g., HTTP requests) from client devices on behalf of the origin servers. The first endpoint is also coupled with a second endpoint, which is referred herein as a far end network optimizer. The far end network optimizer may incorporated into a server of a hosting company, which itself is coupled to an origin server. The far end network optimizer may alternatively be incorporated into the origin server. In some embodiments, the near end network optimizer is coupled with the far end network optimizer through a wide area network (WAN) such as the Internet. The near end network optimizer is referred to as a near end since it is closer to the client devices relative to the far end network optimizer, which is closer to the origin server relative to the client devices.

In one embodiment, when a near end network optimizer transmits a request for a network resource to a far end network optimizer, it also sends a version identifier of the latest version of that network resource that it has stored (this version is sometimes referred herein as the initial version). The far end network optimizer determines whether it has access to that version and if it has, the far end network optimizer retrieves the most recent version of the network resource (this version is sometimes referred herein as the current version and is typically different than the initial version but it can also be the same as the initial version), determines the differences between the versions (sometimes referred herein as the delta), and replies to the near end network optimizer with the differences between the versions (and not the entire network resource). The near end network optimizer applies the differences to its version of the network resource to generate the latest version of the resource, and transmits the latest version of the resource to the client device.

Since the difference between versions is transmitted to the near end network optimizer instead of the entire resource, the size of the response can be reduced (often substantially). Thus, bandwidth usage is reduced between the near end network optimizer and the far end network optimizer. In addition, performance is increased (in particular the amount of time that the resource is delivered to the client) as the near end network optimizer does not have to wait until the entire resource is returned.

FIG. 1 illustrates an exemplary system for reducing network resource transmission size using delta compression according to one embodiment. FIG. 1 includes the client device 110 that is coupled with the near end network optimizer 120 which is itself coupled with the far end network optimizer 140. The client device 110 is a computing device that is capable of accessing network resources (e.g., laptops, workstations, smartphones, palm tops, mobile phones, tablets, gaming systems, set-top boxes, etc.). The client device 110 includes a client network application (e.g., web browser, FTP client, SSH client, Telnet client, etc.) that is capable of establishing connections for the purpose of sending requests and receiving network resources. For example, a user of the client device 110 requests network resources (e.g., HTML pages, images, word processing documents, PDF files, movie files, music files, or other computer files) through the client network application. Although FIG. 1 illustrates a single client device, it should be understood that typically there are many more client devices that are coupled with the near end network optimizer 120.

In some embodiments, the near end network optimizer 120 is coupled with the far end network optimizer 140 through a wide area network (WAN) such as the Internet. In a specific example, the near end network optimizer 120 may be part of a proxy server that receives requests (e.g., HTTP requests) from client devices (including the client device 110) on behalf of one or more origin servers. By way of a specific example, the proxy server may receive network traffic destined for origin servers (e.g., HTTP requests) as a result of a Domain Name System (DNS) request for the domains of the origin servers resolving to the proxy server. The proxy server may include a cache for returning network resources, as well as providing other services (e.g., protecting against Internet-based threats (e.g., proactively stopping botnets, cleaning viruses, trojans, and worms, etc.), performance services (e.g., acting as a node in a CDN and dynamically caching customer's files closer to clients, page acceleration, etc.), and/or other services).

The far end network optimizer 140 may incorporated into a server of a hosting company, which itself is coupled to an origin server (not illustrated for purposes of convenience). The far end network optimizer may alternatively be incorporated into the origin server.

The near end network optimizer 120 includes the dynamic dictionary 124 and the far end network optimizer 140 includes the dynamic dictionary 144. The dynamic dictionaries are used by the network optimizers to store version(s) of resources and optionally version identifier(s). For example, the dynamic dictionary 124 stores version(s) of resources 126 and optionally the version identifiers 128, and the dynamic dictionary 144 stores version(s) of resources 146 and optionally the version identifiers 148. In one embodiment the dynamic dictionaries 124 and/or 144 store only a single version of a resource; in other embodiments the dynamic dictionaries 124 and/or 144 are configured to store multiple versions of a resource. FIG. 1 illustrates the logical structure of the dynamic dictionaries 124 and 144 and the structure may be different in different embodiments. In a specific example, the resources fields 126 and 146 include a URL portion and a resource portion. When determining whether a dynamic dictionary includes a requested resource, the URL of the requested resource may be used when accessing the dynamic dictionary.

In another embodiment, the dynamic dictionary 144 may store the differences between versions of a resource, in lieu of or in addition to the actual resource version. The stored differences may be linked or associated in order to be used to reconstruct the resource versions (e.g., the initial versions), which will be described in greater detail later herein. For example, the stored differences may be in a chain from oldest to newest or may be in another format (e.g., a tree structure). Storage space is reduced by storing the differences between versions of a resource instead of copies of the resource, with a trade off for the time necessary for reconstruction.

In some embodiments the dynamic dictionaries are built dynamically as requests for resources are received and retrieved. By way of example, the client device 110 transmits a request 160 for a resource (e.g., an HTTP request), which is received by the request module 122 of the near end network optimizer 120. The request may be received at the request module 122 as a result of a cache mechanism of the proxy server determining that the requested resource cannot be returned to the requesting client device (e.g., the resource has been set as "no-cache", the cache has expired, etc.).

The request module 122 accesses the dynamic dictionary 124 to determine whether it includes a copy of the requested resource. If it does not, then the request module 122 causes a request to be transmitted to the far end network optimizer 140 for the requested resource. The far end network optimizer 140 retrieves the requested resource (e.g., the far end network optimizer 140 makes a request to the origin server for the requested resource, or if locally available, the far end network optimizer 140 accesses the local version), updates its dynamic dictionary 144 to include the latest version of the resource, and replies to the near end network optimizer 120 with the requested resource. Updating its dynamic dictionary 144 may include storing a version identifier, which is a value that identifies a version of a network resource, and associating the version identifier with the resource version. By way of a specific example, the version identifier generator module 155 may generate the version identifier by hashing the contents of the resource (e.g., using a suitable hashing algorithm such as Secure Hash Algorithm (SHA)), with the results being the version identifier. As another example, the last-modified header may be used as the version identifier. As yet another example, a value may be chosen and included in the ETag header field. The response module 150 of the far end network optimizer 140 causes a response (e.g., an HTTP response) that includes the requested resource to be transmitted to the near end network optimizer 120, which is received by the response module 130. The response may, in some embodiments, include the version identifier. The response may include a no-cache directive.

The response module 130 causes the resource to be stored in the dynamic dictionary 128, along with the version identifier if one was provided in the response from the far end network optimizer 140. In some embodiments, the response module 130 causes the resource version to be stored in the dynamic dictionary 124 even if it has a no-cache directive set. Thus, by way of example, a version of a news website, which changes frequently, is stored in the dynamic dictionary 124 even if the no-cache directive is set.

In some embodiments, if the version identifier was not included in the response from the far end network optimizer 140, the version identifier generator module 135 generates a version identifier to store in the dynamic dictionary 124 (e.g., it hashes the resource and stores the resulting value as the version identifier).

After receiving a request for a resource that is the dynamic dictionary 124, the near end network optimizer 120 transmits a request 162 for that resource that includes the version identifier of the last known version to the far end network optimizer 140. The version identifier may be previously stored and associated with the resource, or in some embodiments, the version identifier is generated by the version identifier generator module 135 (e.g., the resource is hashed). The request may also indicate (e.g., in a header) that it is requesting the delta between the version identified in the version identifier and the latest version of the resource.

The request module 142, upon receiving the request 162, accesses its dynamic dictionary 144 to determine whether it has access to the version of the resource identified by the version identifier included in the request 162. In one embodiment, the request module 142 determines has access to the version of the resource if a same copy of that resource is stored in the dynamic dictionary 144. In another embodiment, the request module 142 has access to the identified resource version if that version of the resource can be reconstructed using the stored differences between versions of a resource. If the request module 142 does not have access to that version, then the far end network optimizer 140 retrieves the requested resource (e.g., the far end network optimizer 140 makes a request to the origin server for the requested resource, or if locally available, the far end network optimizer 140 accesses the local version), updates its dynamic dictionary 144 to include the latest version of the resource, and replies to the near end network optimizer 120 with the requested resource, which may be compressed using a suitable non-delta compression algorithm such as gzip.

If the request module 142 has access to the version (e.g., the dynamic dictionary 144 of the far end network optimizer 140 includes the same version of the resource identified by the version identifier included in the request 162 or that version can be reconstructed using the stored differences between versions of that resource), the far end network optimizer 140 retrieves the requested resource (e.g., the far end network optimizer 140 makes a request to the origin server for the requested resource, or if locally available, the far end network optimizer 140 accesses the local version), updates its dynamic dictionary 144 to include the latest version of the resource, and determines the differences between the versions.

For example, the difference determination module 152 determines the differences between the versions. A number of algorithms may be used to determine the differences between the versions, including Xdelta3, VCDIFF (described in RFC 3284, "The VCDIFF Generic Differencing and Compression Data Format", June 2002), Bentley/McIlroy compression, bsdiff, etc.

In embodiments where the differences between versions of a resource are stored, the difference determination module 152 may traverse the differences to reconstruct the initial version (the version identified in the request 162) in order to determine the differences between the initial version and the current version. By doing so, storage space may be reduced as the versions of the resource may not need to be stored, with a trade off for the time necessary for reconstructing.

The response module 150 causes a response 164 (e.g., an HTTP response) to be transmitted to the near end network optimizer 120, the response 164 including the differences between the versions (between the initial version and the current version). The response 164 does not contain the entire resource. In one embodiment, a header in the response 164 indicates that it contains the differences between versions (not the entire resource). The header may also indicate the algorithm used to determine the differences. In one embodiment, the far end network optimizer 140 also transmits the version identifier to the near end network optimizer 120.

In one embodiment, the far end network optimizer 140 also compresses the response using a suitable compression algorithm. For example, the response may be compressed using gzip. As another example, the response may be compressed using zlib compression that is pre-warmed using the version of the resource identified in the request 162. Pre-warming allows the compression algorithm to understand more about the data that is being compressed and therefore typically provides a more accurate and faster compression. The far end network optimizer 140 may also perform pre-warmed compression (e.g., zlib compression) of the HTTP headers of the response 164 based on the version of the resource in the dynamic dictionary 144 and identified in the request 162.

The response module 130 of the near end network optimizer 120 receives the response 164. The difference application module 132 of the response module 130 applies the differences indicated in the response 164 to the resource version included in the dynamic dictionary 124 to generate the latest version of the resource. The response module 130 causes a response 166 (e.g., an HTTP response) with the requested resource to be transmitted to the client device 110. The response module 130 also causes the updated version to be stored in the dynamic dictionary 124, and optionally a version identifier associated with the updated version.

Figure 2:
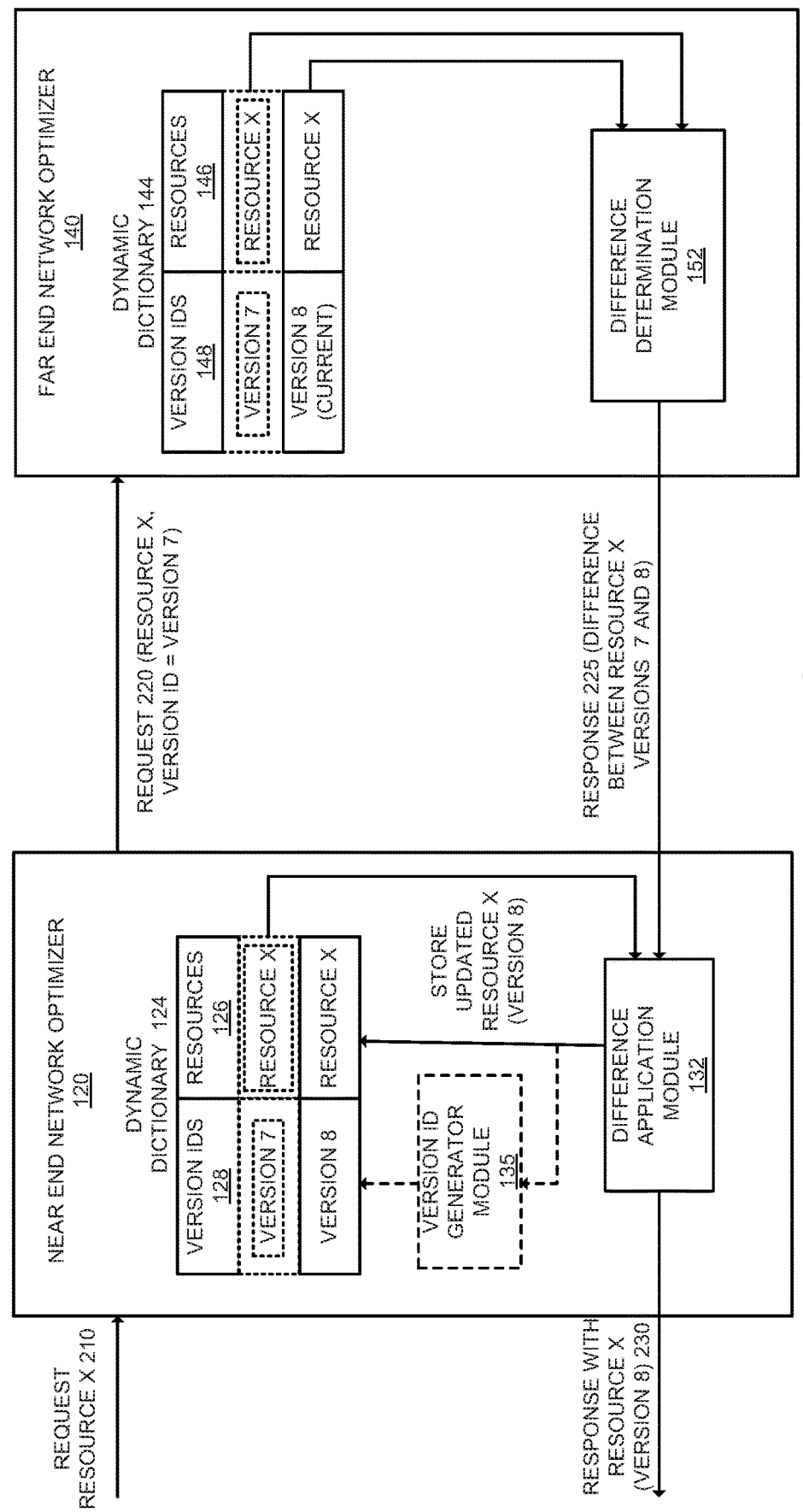
FIG. 2 illustrates the exemplary system of FIG. 1 in more detail according to one embodiment.

FIG. 2 illustrates the exemplary system of FIG. 1 in more detail according to one embodiment. The near end network optimizer 120 receives a request 210 for a resource A. The resource A may be a HyperText Markup Language (HTML) file, a text document, or any other type of resource. The near end network optimizer 120 determines that is has a version of the resource X in its dynamic dictionary 124. As illustrated in FIG. 2, the dynamic dictionary 124 includes the resource X, which is associated with the version identifier 7. The near end network optimizer 120 causes a request 220 for resource X to be transmitted to the far end network optimizer 140, the request including the version identifier 7.

The far end network optimizer 140 determines that it has access to the same version (version 7) identified by the version identifier included in the request 220 for the resource X in its dynamic dictionary 144. As illustrated in FIG. 2, version 7 of the resource is stored in the dynamic dictionary 144. The far end network optimizer 140 retrieves the latest version of the resource (referred to in FIG. 2 as version 8) (e.g., the far end network optimizer 140 makes a request to the origin server for the requested resource, or if locally available, the far end network optimizer 140 accesses the local version). The difference determination module 152 determines the differences between version 7 and version 8 of the resource X. The far end network optimizer 140 causes a response 225 to be transmitted to the near end network optimizer 120 that identifies the differences between version 7 and version 8. The differences file that is transmitted to the near end network optimizer 120 is such that the near end network optimizer 120 can apply those differences to its latest version of the resource (version 7) to generate the current version (version 8). The far end network optimizer 140 may also include a version identifier. The far end network optimizer 140 updates its dynamic dictionary 144 with the latest version of resource X (version 8).

Responsive to receiving the differences, the difference application module 132 applies the differences to the version 7 of the resource X, to generate the version 8 of the resource X. The differences may indicate to delete content, add content, move content, etc. After generating the latest version of the resource X, the near end network optimizer 120 causes a response 230 to be transmitted to the requesting client with the version 8 of the resource X. The near end network optimizer 120 also updates its dynamic dictionary 124 with the updated version of the resource X (version 8).

Figure 3:
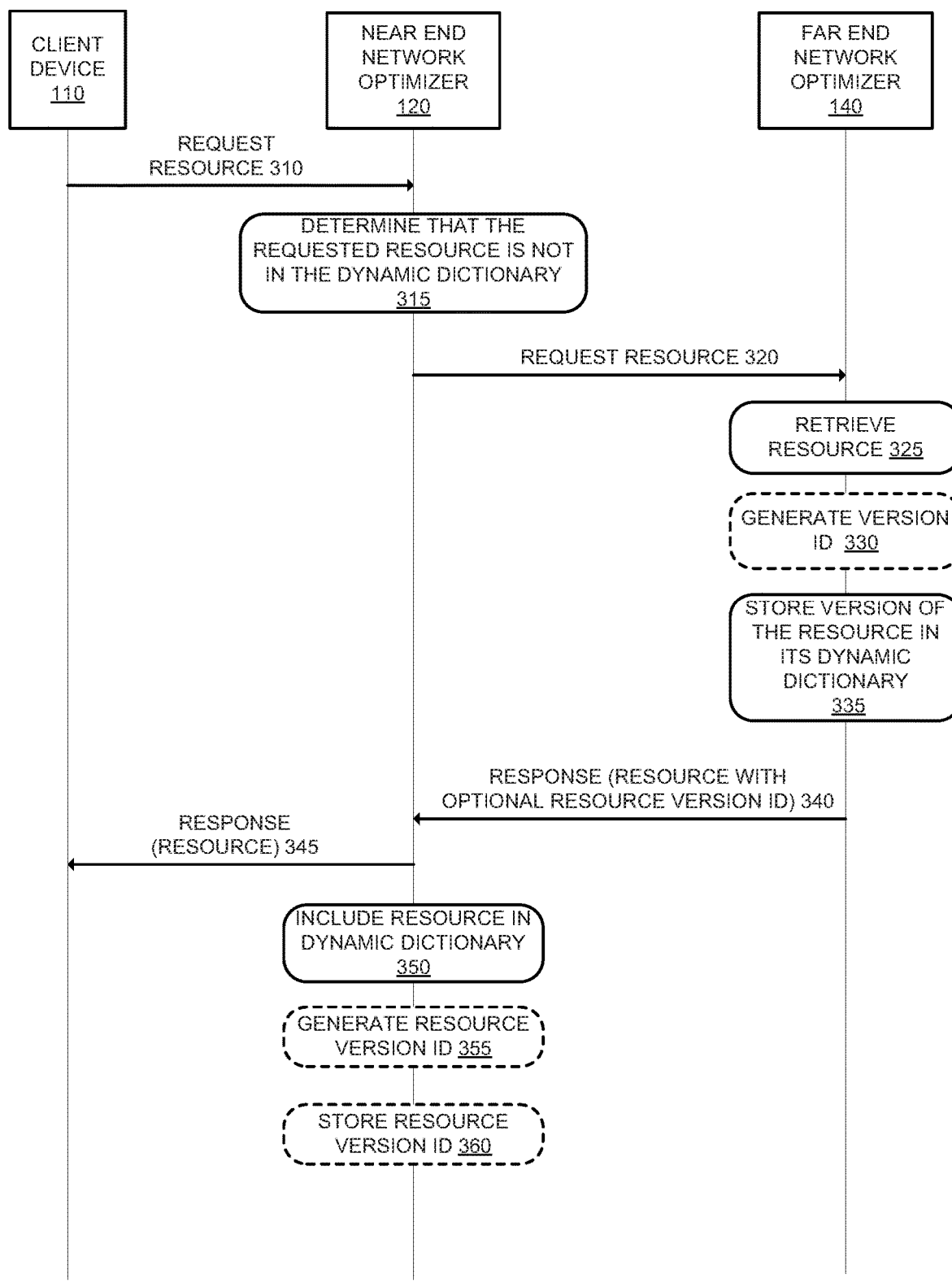
FIG. 3 illustrates a sequence of exemplary operations performed when a network resource is not in the dynamic dictionary of the near end network optimizer according to one embodiment.

FIG. 3 illustrates a sequence of exemplary operations performed when a network resource is not in the dynamic dictionary of the near end network optimizer according to one embodiment. At operation 310, the near end network optimizer 120 receives a request for a resource. Next, at operation 315, the near end network optimizer 120 determines that the requested resource is not in its dynamic dictionary 124. As a result, at operation 320, the near end network optimizer 120 transmits a request for the resource 320 to the far end network optimizer 140.

The far end network optimizer 140 receives the request, and retrieves the most current version of the resource at operation 325. For example, the far end network optimizer 140 transmits a request for the resource to the origin server, or if locally available, the far end network optimizer 140 accesses the local version of the resource.

Next, the far end network optimizer 140 may generate a version identifier for the retrieved resource at operation 330. For example, the far end network optimizer 140 may hash the resource to generate a value that is used for the version identifier. In other embodiments, the far end network optimizer 140 does not generate a version identifier. For example, the value of the version identifier may be set by the origin server (e.g., the value of the last-modified header, the value of the ETag header field). The far end network optimizer 140 stores the version of the resource in its dynamic dictionary 144 at operation 335, and may associate it with the version identifier. In one embodiment, the far end network optimizer 140 may determine the differences between the current version (retrieved at operation 325) and the most immediately previous version (if one exists), store those differences in the dynamic dictionary 144, and may remove older versions of the resource from the dynamic dictionary 144.

The far end network optimizer 140, at operation 340, transmits a response to the near end network optimizer 120 that includes the requested resource and optionally includes a version identifier for that resource. While FIG. 3 illustrates the operation 340 being performed after the operations 330 and 335, the operations 330 and/or 335 may be performed after operation 340 in some embodiments.

The near end network optimizer 120 receives the response that includes the requested resource and transmits a response to the client device 110 with the requested resource at operation 345. The near end network optimizer 120 stores the requested resource in its dynamic dictionary 124 at operation 350. The near end network optimizer 120 may also generate a resource version identifier for the resource at operation 355, and may store the resource version identifier at operation 360.

Figure 4:
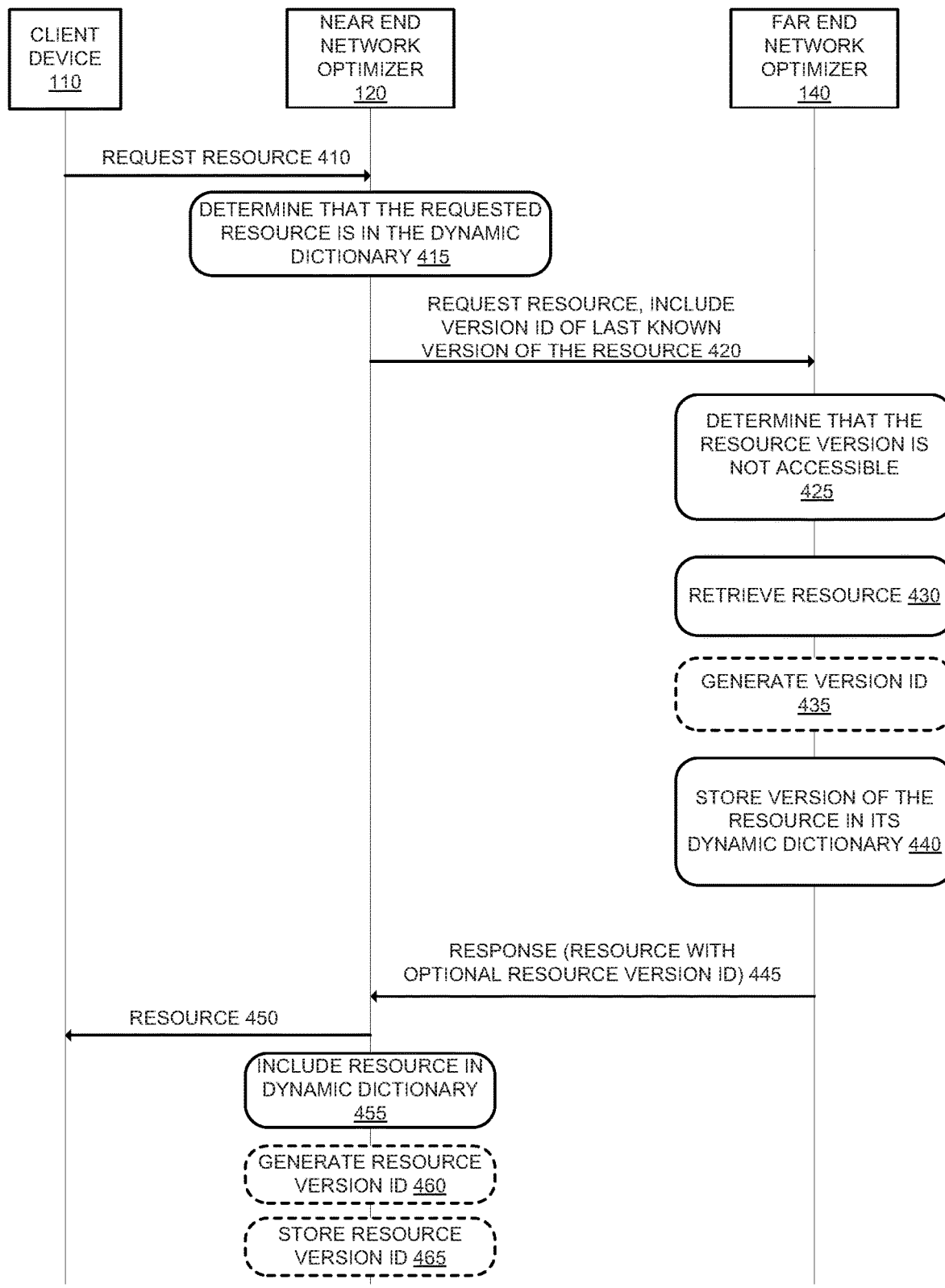
FIG. 4 illustrates a sequence of exemplary operations performed when a network resource is included in the dynamic dictionary of the near end network optimizer and the same version is not included in the dynamic dictionary of the far end network optimizer according to one embodiment.

FIG. 4 illustrates a sequence of exemplary operations performed when a network resource is included in the dynamic dictionary of the near end network optimizer and the same version is not included in the dynamic dictionary of the far end network optimizer according to one embodiment.

At operation 410, the near end network optimizer 120 receives a request for a resource. Next, at operation 415, the near end network optimizer 120 determines that the requested resource is in its dynamic dictionary 124. As a result, at operation 420, the near end network optimizer 120 transmits a request for the resource to the far end network optimizer 140, where the request identifies the version identifier of the most recent version of the resource that is stored in the dynamic dictionary 124 of the near end network optimizer 120.

The far end network optimizer 140 receives the request and determines, in operation 425, that it does not have access to the version of the resource identified in the received request in. For example, its dynamic dictionary 144 does not include the same version of the requested resource and that version cannot be reconstructed. Since the far end network optimizer 140 does not have access to the version of the resource identified in the received request, it will not be able to determine the differences between the version in the dynamic dictionary 124 of the near end network optimizer 120 and the latest version of the resource. At operation 430, the far end network optimizer retrieves the most current version of the resource. For example, the far end network optimizer 140 transmits a request for the resource to the origin server, or if locally available, the far end network optimizer 140 accesses the local version of the resource.

Next, the far end network optimizer 140 may generate a version identifier for the retrieved resource at operation 435. For example, the far end network optimizer 140 may hash the resource to generate a value that is used for the version identifier. In other embodiments, the far end network optimizer 140 does not generate a version identifier. For example, the value of the version identifier may be set by the origin server (e.g., the value of the last-modified header, the value of the ETag header field). The far end network optimizer 140 stores the version of the resource in its dynamic dictionary 144 at operation 340, and may associate it with the version identifier. In one embodiment, the far end network optimizer 140 may determine the differences between the retrieved version (retrieved at operation 430) and the most immediately previous version (if one exists), store those differences in the dynamic dictionary 144, and may remove older versions of the resource from the dynamic dictionary 144.

The far end network optimizer 140, at operation 445, transmits a response to the near end network optimizer 120 that includes the requested resource and optionally includes a version identifier for that resource. While FIG. 4 illustrates the operation 445 being performed after the operations 435 and 440, the operations 435 and/or 440 may be performed after operation 445 in some embodiments.

The near end network optimizer 120 receives the response that includes the requested resource and transmits a response to the client device 110 with the requested resource at operation 450. The near end network optimizer 120 stores the requested resource in its dynamic dictionary 124 at operation 455. The near end network optimizer 120 may also generate a resource version identifier for the resource at operation 460 and may store the resource version identifier at operation 465.

Figure 5:
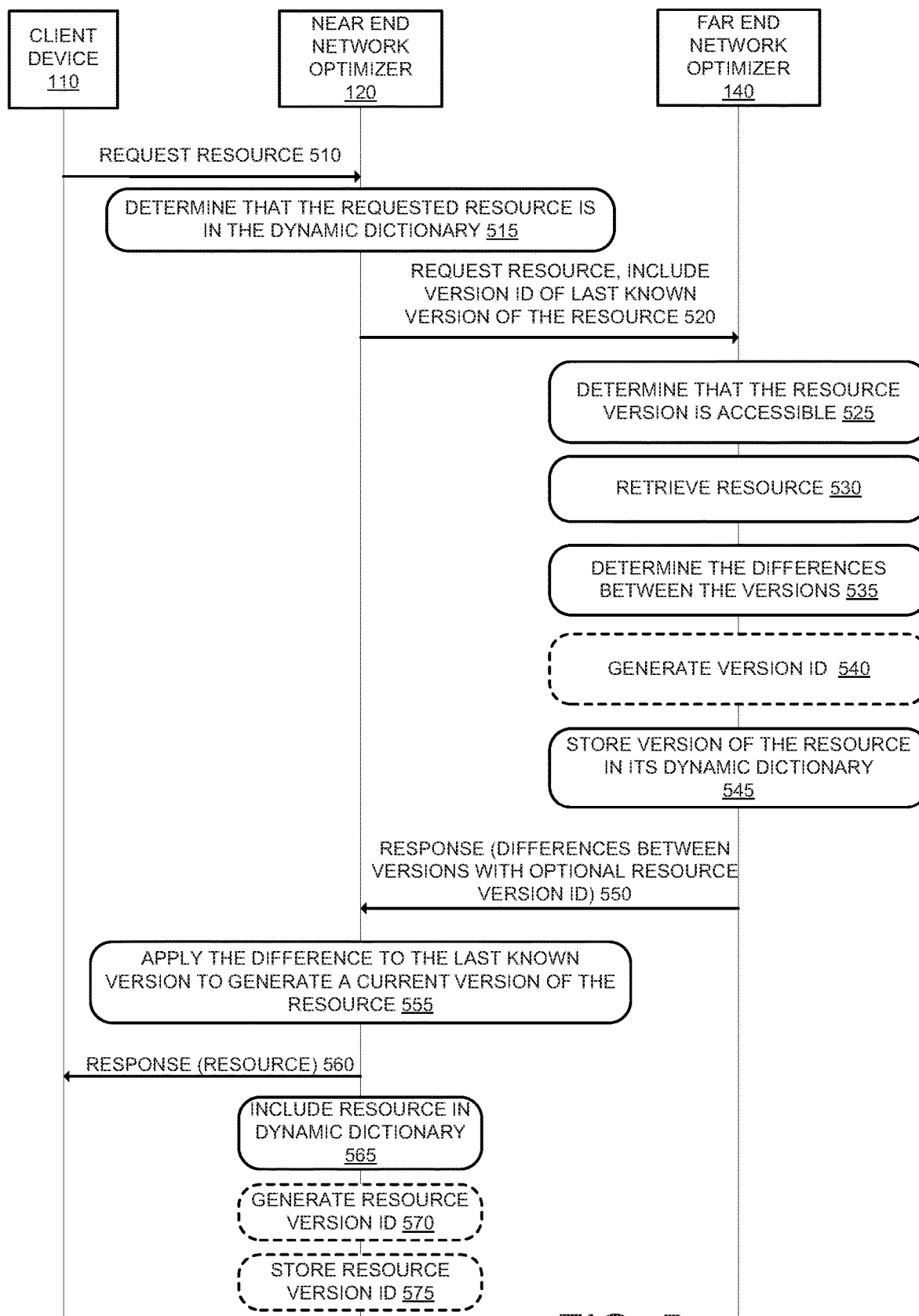
FIG. 5 illustrates a sequence of exemplary operations performed when a network resource is included in the dynamic dictionary of the near end network optimizer and the same version is included in the dynamic dictionary of the far end network optimizer according to one embodiment.

FIG. 5 illustrates a sequence of exemplary operations performed when a network resource is included in the dynamic dictionary of the near end network optimizer and the same version is included in the dynamic dictionary of the far end network optimizer according to one embodiment.

At operation 510, the near end network optimizer 120 receives a request for a resource. Next, at operation 515, the near end network optimizer 120 determines that the requested resource is in its dynamic dictionary 124. As a result, at operation 520, the near end network optimizer 120 transmits a request for the resource to the far end network optimizer 140, where the request identifies the version identifier of the most recent version of the resource that is stored in the dynamic dictionary 124 of the near end network optimizer 120.

The far end network optimizer 140 receives the request and determines, in operation 525, that it has access to the version of the resource identified in the request of operation 520. For example, the dynamic dictionary 144 includes the same version or that version can be reconstructed using stored version differences. This version of the resource may or may not be the most current version of the resource. Therefore, at operation 530 the far end network optimizer retrieves the most current version of the resource. For example, the far end network optimizer 140 transmits a request for the resource to the origin server, or if locally available, the far end network optimizer 140 accesses the local version of the resource.

The far end network optimizer 140 determines the differences between the versions of the resource at operation 535. For example, the Xdelta3, VDDIFF, Bentley/McIlroy compression, bsdiff, or other algorithm that can be used to determine the differences between the versions of the resource, is used to determine the differences. In a situation where the version identified in the request of operation 520 (the initial version) is not stored but a chain or tree of differences is, the far end network optimizer 140 may traverse the chain or tree of differences to reconstruct the initial version and use that reconstructed version when determining the differences between the initial version and the current version.

Next, the far end network optimizer 140 may generate a version identifier for the retrieved resource at operation 540. For example, the far end network optimizer 140 may hash the resource to generate a value that is used for the version identifier. In other embodiments, the far end network optimizer 140 does not generate a version identifier. For example, the value of the version identifier may be set by the origin server (e.g., the value of the last-modified header, the value of the ETag header field). The far end network optimizer 140 stores the version of the resource in its dynamic dictionary 144 at operation 545, and may associate it with the version identifier. In one embodiment, the far end network optimizer 140 may determine the differences between the current version (retrieved at operation 530) and the most immediately previous version, store those differences in the dynamic dictionary 144, and may remove the older versions of the resource from the dynamic dictionary 144.

The far end network optimizer 140, at operation 550, transmits a response to the near end network optimizer 120 that includes the differences between the versions and does not include the complete network resource. The response may also include a version identifier associated with the network resource (that is to identify the version of the resource once updated by the near end network optimizer 120). The response may also indicate the algorithm used to generate the differences. In one embodiment, if there is not a difference between versions of the resource, the far end network optimizer 140 transmits a NULL difference or other message to the near end network optimizer 120 that indicates that there are no differences. While FIG. 5 illustrates the operation 550 being performed after the operations 540 and 545, the operations 540 and/or 545 may be performed after operation 550 in some embodiments.

The near end network optimizer 120 receives the response, and applies the differences to its last known version to generate a current version of the network resource at operation 555. At operation 560, the near end network optimizer 120 transmits a response to the client device 110 with the requested resource (the updated resource). The near end network optimizer 120 stores the updated resource in its dynamic dictionary 124 at operation 565. The near end network optimizer 120 may also generate a resource version identifier for the resource at operation 560 (e.g., if one was not included in the response 550) and may store the resource version identifier at operation 575.

Figure 6:
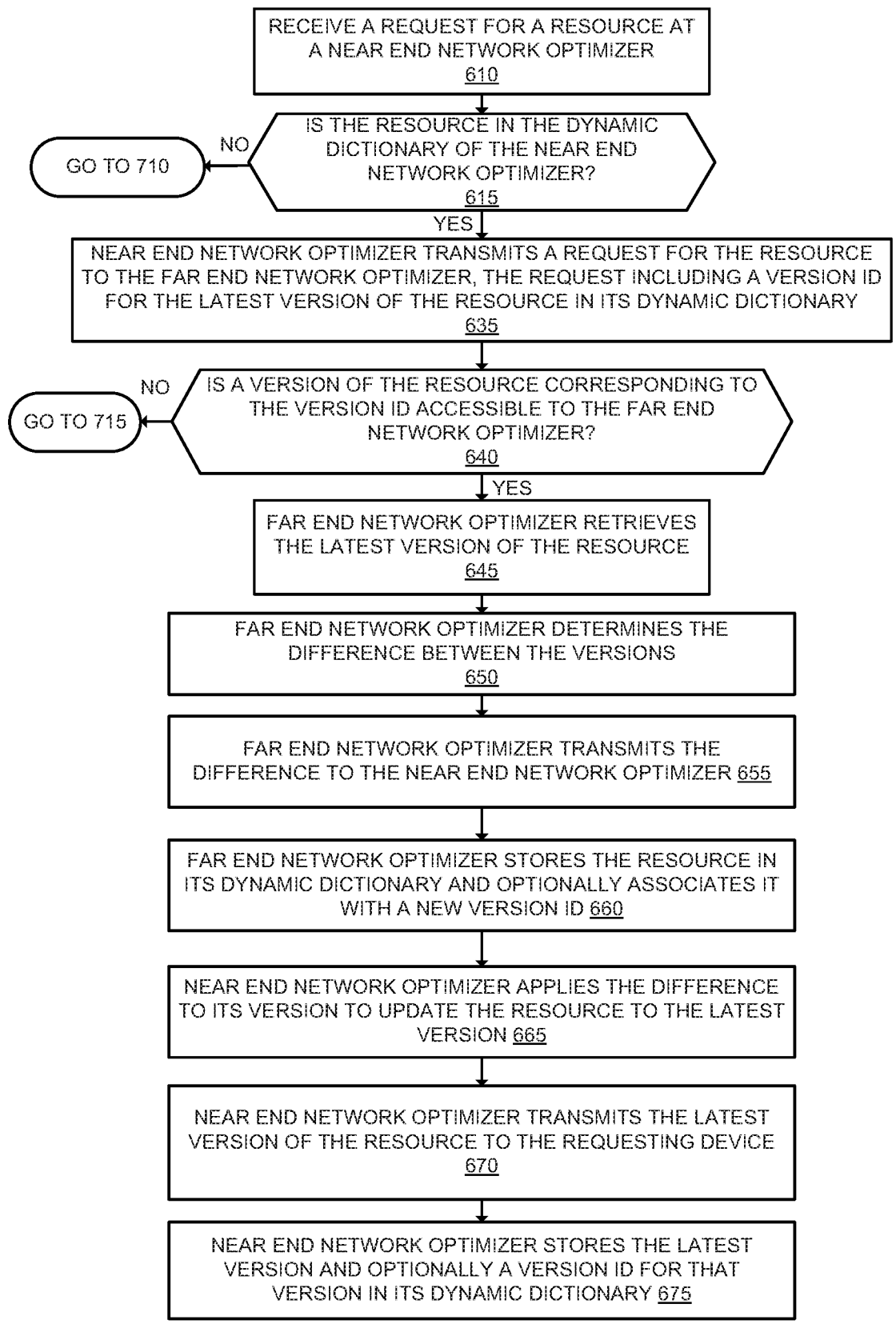
FIG. 6 is a flow diagram illustrating exemplary operations performed for a delta compression technique for compressing the payload size of network resources according to one embodiment.

FIG. 6 is a flow diagram illustrating exemplary operations performed for a delta compression technique for compressing the payload size of network resources according to one embodiment. The operations of this and other flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 610, the near end network optimizer 120 receives a request for a network resource. By way of example, the request is an HTTP request sent from the client device 110 and the resource is identified at a Uniform Resource Locator (URL) included in the request. Flow then moves to operation 615 where the near end network optimizer 120 determines whether the resource is included in the dynamic dictionary 124. For example, the request module 122 accesses the dynamic dictionary 124 to determine whether the URL for the requested resource is included and whether there is a corresponding version of the resource. If there is not, then flow moves to operation 710, which will be described with reference to FIG. 7. If there is a version of the resource in the dynamic dictionary of the near end network optimizer 124, then flow moves to operation 635.

At operation 635, the near end network optimizer 120 transmits a request for the resource to the far end network optimizer 124. The request includes a version identifier for the requested resource. In one embodiment, the version identifier that is included in the request is the version identifier that is associated with the latest version of the resource that is included in the dynamic dictionary 124. By way of a specific example, the request may be an HTTP request, and the request may also indicate (e.g., in a header) that it is for the delta between the version identified through the included version identifier and the latest version of the resource. Flow then moves to operation 640.

At operation 640, the far end network optimizer 140 receives the request and determines whether it has access to the identified version of the requested resource. In one embodiment, the far end network optimizer 140 has access to the version of the resource if a same copy of that resource is stored in the dynamic dictionary 144. In another embodiment, the request module 142 has access to the identified resource version if that version of the resource can be reconstructed using the stored differences between versions of a resource. For example, the request module 142 searches for the URL of the requested resource in the dynamic dictionary 144. If found, the far end network optimizer 140 compares the version identifier included in the request with the version identifier(s) stored for the resource (if version identifier(s) are stored locally) or stored for the version differences. In embodiments where the version identifier(s) are not stored, a version identifier may be generated by the version identifier generation module 155 and compared with the version identifier included in the request. If the version is not accessible, then flow moves to operation 715, which will be described with reference to FIG. 7. However, if the identified version of the resource is accessible, then flow moves to operation 645.

At operation 645, the far end network optimizer 140 retrieves the most current version of the requested resource. In some implementations the far end network optimizer 140 is located in a different geographical location than the origin server, where the resource originally resides or is created (the far end network optimizer 140 may be part of the same Local Area Network (LAN) as the origin server, or may be located across a WAN). In these implementations, the far end network optimizer 140 transmits a request towards the origin server (e.g., an HTTP request) requesting the resource (with an expectation that the origin server will reply with the most current version of the resource). In other implementations, the far end network optimizer 140 is part of a system that has local access to the network resources (e.g., it is implemented in conjunction with the origin server, it is being provided with resources as they are being updated/created by the origin server, etc.). In these implementations, the far end network optimizer 140 accesses the latest version through local methods. Flow moves from operation 645 to operation 650.

At operation 650, the far end network optimizer 140 determines the difference between the versions. For example, the difference determination module 152 applies an algorithm such as Xdelta3, VCDIFF, Bentley/McIlroy compression, bsdiff, or other algorithm suitable for determining the differences between versions of files, to determine the differences (if any) between the versions. In a situation where the version identified in the request of operation 635 (the initial version) is not stored but a chain or tree of differences is, the far end network optimizer 140 may traverse the chain or tree of differences to reconstruct the initial version and use that reconstructed version when determining the differences between the initial version and the current version.

Flow then moves to operation 655 where the far end network optimizer 140 transmits the difference to the near end network optimizer 120 (and not the complete resource). For example, the response module 150 formats a response (e.g., an HTTP response) that includes a file containing the differences between the versions. If there is not any difference, then the response includes a NULL difference or otherwise indicates that the version stored in the dynamic dictionary 124 of the near end network optimizer is the most current version. The response may also include a header that indicates that it contains the differences between versions, and not the entire resource. Also, the response may indicate the algorithm used to determine the differences. In one embodiment, the response is also compressed using gzip or other suitable compression techniques. For example, the in some embodiments the far end network optimizer 140 performs pre-warmed compression (e.g., zlib compression) of the response and/or the HTTP headers of the response (based on the version of the resource identified in the request from the near end network optimizer).

The response may also include a version identifier associated with the network resource that is to identify the version of the resource once updated by the near end network optimizer 140. The version identifier may be generated by the far end network optimizer 140 (e.g., a hash of the resource version). As another example, the version identifier may be set by the origin server (e.g., the value of the last-modified header, the value in an ETag header field, a hash of the resource, etc.). Flow then moves to operation 660, where the far end network optimizer 140 stores the resource in its dynamic dictionary 144 and optionally associates it with the version identifier. In one embodiment, the far end network optimizer 140 may determine the differences between the current version (retrieved at operation 645) and the most immediately previous version, store those differences in the dynamic dictionary 144, and may remove the older versions of the resource from the dynamic dictionary 144. Flow moves from operation 660 to operation 665.

At operation 665, the near end network optimizer 120 applies the differences specified in the differences file received from the far end network optimizer 140 to the version of the network resource in its dynamic dictionary 124 to generate an updated version of the network resource. For example, the difference file may specify to add content, delete content, move content, etc.

Flow then moves to operation 670 where the near end network optimizer 120 transmits the latest version (the updated version of the requested resource) to the requesting device (e.g., the client device 110). Flow then moves to operation 675 where the near end network optimizer stores the latest version in its dynamic dictionary 124 and optionally stores a version identifier for that version in its dynamic dictionary 124 (which it may generate, depending on whether the response from the far end network optimizer included the version identifier).

Figure 7:
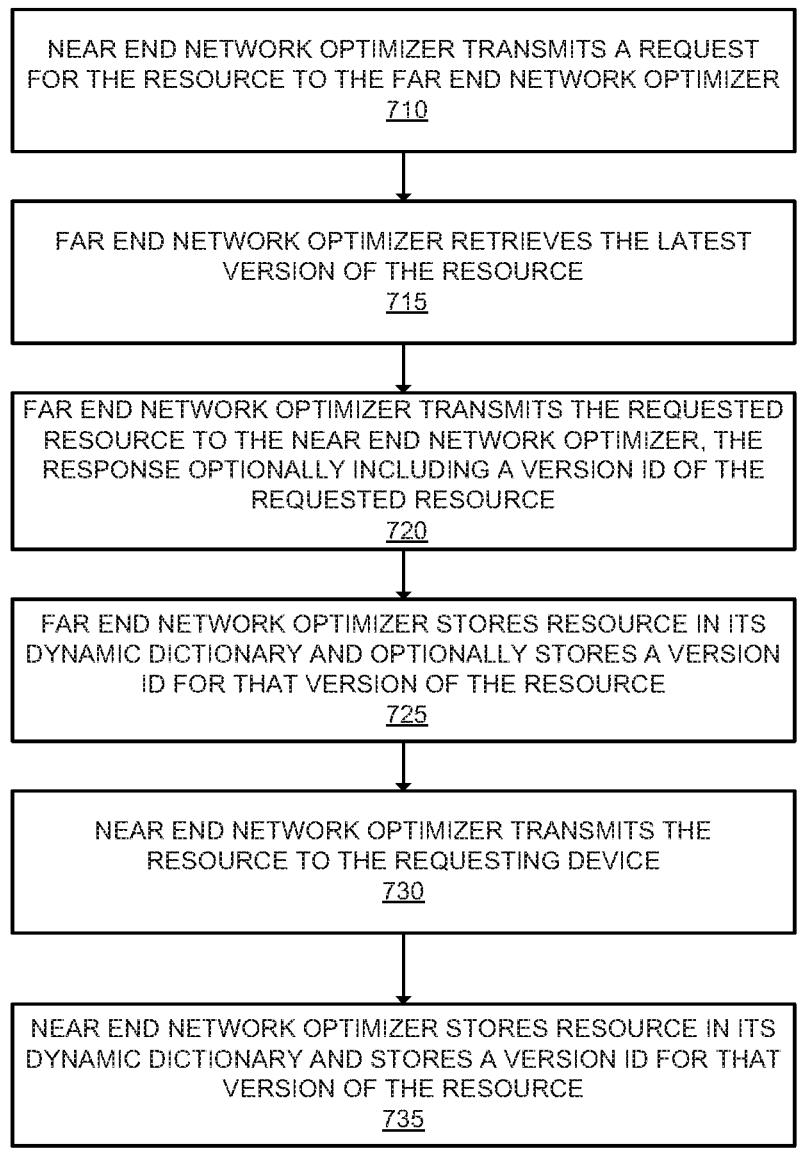
FIG. 7 is a flow diagram illustrating exemplary operations performed when the requested resource is not in the dynamic dictionary of the near end network optimizer and/or the far end network optimizer according to one embodiment.

FIG. 7 is a flow diagram illustrating exemplary operations performed when the requested resource is not in the dynamic dictionary of the near end network optimizer and/or the far end network optimizer according to one embodiment. When the requested resource is not in the dynamic dictionary 124 of the near end network optimizer 120, the near end network optimizer 120 transmits a request (e.g., an HTTP request) for the requested resource to the far end network optimizer 140 at operation 710. Flow then moves to operation 715 and the far end network optimizer 140 retrieves the latest version of the resource as previously described. Next, at operation 720, the far end network optimizer 140 transmits the requested resource to the near end network optimizer 120, the response optionally including a version identifier of the requested resource. Flow then moves to operation 725 where the far end network optimizer 140 stores the resource in its dynamic dictionary 144 (or updates its dynamic dictionary) and optionally stores a version identifier for that version of the resource. In one embodiment, the far end network optimizer 140 may determine the differences between the current version and the most immediately previous version (if one exists), store those differences in the dynamic dictionary 144, and may remove older versions of the resource from the dynamic dictionary 144.

Flow then moves to operation 730, where the near end network optimizer 120 transmits the resource to the requesting device. Next, flow moves to operation 735 where the near end network optimizer 120 stores the resource in its dynamic dictionary 124 and optionally stores a version identifier for that version of the resource.

Since the difference between versions is transmitted to the near end network optimizer instead of the entire resource, the size of the response can be reduced (often substantially). Thus, bandwidth usage is reduced between the near end network optimizer and the far end network optimizer. In addition, performance is increased (in particular the amount of time that the resource is delivered to the client) as the near end network optimizer does not have to wait until the entire resource is returned.

In addition, the technique described herein can be used for resources that have been designated as being un-cacheable. As an example, origin servers may include a "no-cache" directive in the Cache-Control header field of an HTTP response that indicates that a cached version of the resource is not to be used to respond to a request without successful revalidation with the origin server. Previously when the no-cache directive was used, proxy servers checked with the origin server to determine whether the resource has been updated and if it has, the proxy server returned with the entire resource, even if there was a minimal change. However, with the techniques described herein, the near end network optimizer makes a request for the differences (if any) between its version and the most recent version and if there is a difference, the far end network optimizer returns the differences and not the entire resource. Also, at least some of the techniques described herein do not have to be supported by the clients. Thus, in some embodiments, client software (e.g., client network applications) does not have to be updated to support the techniques described herein. In addition, unlike the delta encoding proposal in RFC 3229 which requires coordination between the client devices and the origin servers and would require the origin servers to store many versions of the resources (e.g., potentially up to one version for each different client), the techniques described in some embodiments herein allow the far end network optimizer to store only a single version of each resource. In other embodiments described herein, the differences between versions of a resource are stored in lieu of the actual versions, which reduces the amount of storage space required.

Figure 8:
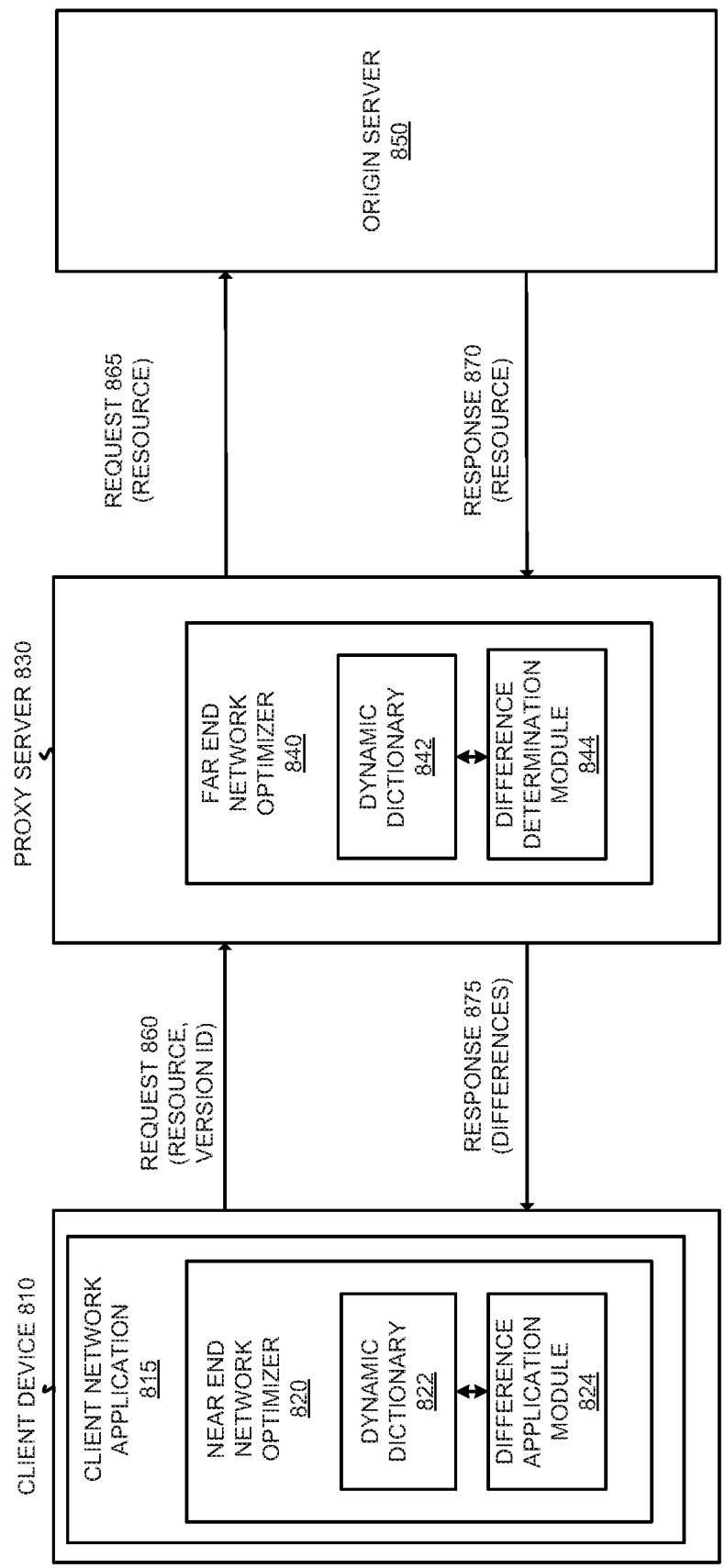
FIG. 8 illustrates an embodiment where a client network application of the client device includes a near end network optimizer according to one embodiment.

While embodiments have been described with respect to the near end network optimizer being incorporated in a device that is coupled to a client computing device (e.g., a proxy server), in other embodiments, similar functionality described herein with reference to the near end network optimizer may be incorporated into the client computing device For example, FIG. 8 illustrates an embodiment where the client network application 815 of the client device 810 includes the near end network optimizer 820 that performs similar operations as the near end network optimizers previously described herein. For example, the near end network optimizer 820 includes the dynamic dictionary 822, which is similar to the dynamic dictionary 124 and stores version(s) of resources and optionally version identifier(s). The near end network optimizer 820 also includes the difference application module 824, which operates in a similar way as the difference application module 132.

The proxy server 830 includes the far end network optimizer 840, which operates in a similar way as the far end network optimizer 140. For example, the far end network optimizer 840 includes the dynamic dictionary 842, which is similar to the dynamic dictionary 144 and stores version(s) of resources and optionally version identifier(s). The far end network optimizer 840 also includes the difference determination module 844, which operates in a similar way as the difference determination module 152.

The client device 810 transmits requests for network resources of the origin server 850 to the proxy server 830 and receives responses from the proxy server 830. In one embodiment, requests (e.g., HTTP requests) are received at the proxy server 830 as a result of a DNS request for the domain of the origin server 850 resolving to the proxy server 830. In some embodiments, the authoritative name server of the domain of the origin server is changed and/or individual DNS records are changed to point to the proxy server (or point to other domain(s) that point to a proxy server of the service). For example, owners and/or operators of the domain of the origin server 850 may change their DNS using a CNAME record that points to the proxy server 830. While FIG. 8 illustrates a single proxy server 830, in some embodiments the service has multiple proxy servers that are geographically distributed. For example, in some embodiments, there are multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

The near end network optimizer 820 dynamically builds the dynamic dictionary 822 in a similar way as previously described herein, according to one embodiment, and is capable of receiving the differences of network resources and applying those differences to previously stored files.

For example, upon determining to transmit a request for a network resource that is stored in the dynamic dictionary 822 (e.g., as a result of the network resource being set as "no-cache", the cached version of the network resource in the cache of the client network application 815 being expired, etc.), the client network application 815 transmits a request 860 for the resource, along with the version identifier of the last known version of that resource to the proxy server 830.

The far end network optimizer 840 receives the request and determines whether it has access to the identified version of the network resource. Assuming that it does, the far end network optimizer 840 retrieves the most current version of the resource. As illustrated in FIG. 8, the proxy server 830 transmits the request 865 to the origin server 850 for the requested resource in order to receive the most current version of the resource. The proxy server 830 receives the response 870, which includes the requested resource.

The difference determination module 844 receives the requested resource and determines the differences between the versions of the resource as previously described. The far end network optimizer 840 causes the response 875 to be transmitted to the client network application 815 that identifies the differences between the versions. The response 875 does not include the entire network resource. The response 875 may also include a version identifier in some embodiments. The far end network optimizer 840 updates its dynamic dictionary 842 with the most current version of the resource and may store the differences in the dynamic dictionary 842 and remove old versions of the resource.

Responsive to receiving the differences, the difference application module 824 applies the differences to its previous version to generate the most current version of the resource. The most current version may then be displayed by the client network application 815. The near end network optimizer 820 also updates its dynamic dictionary 822 with the updated version of the resource.

Figure 9:
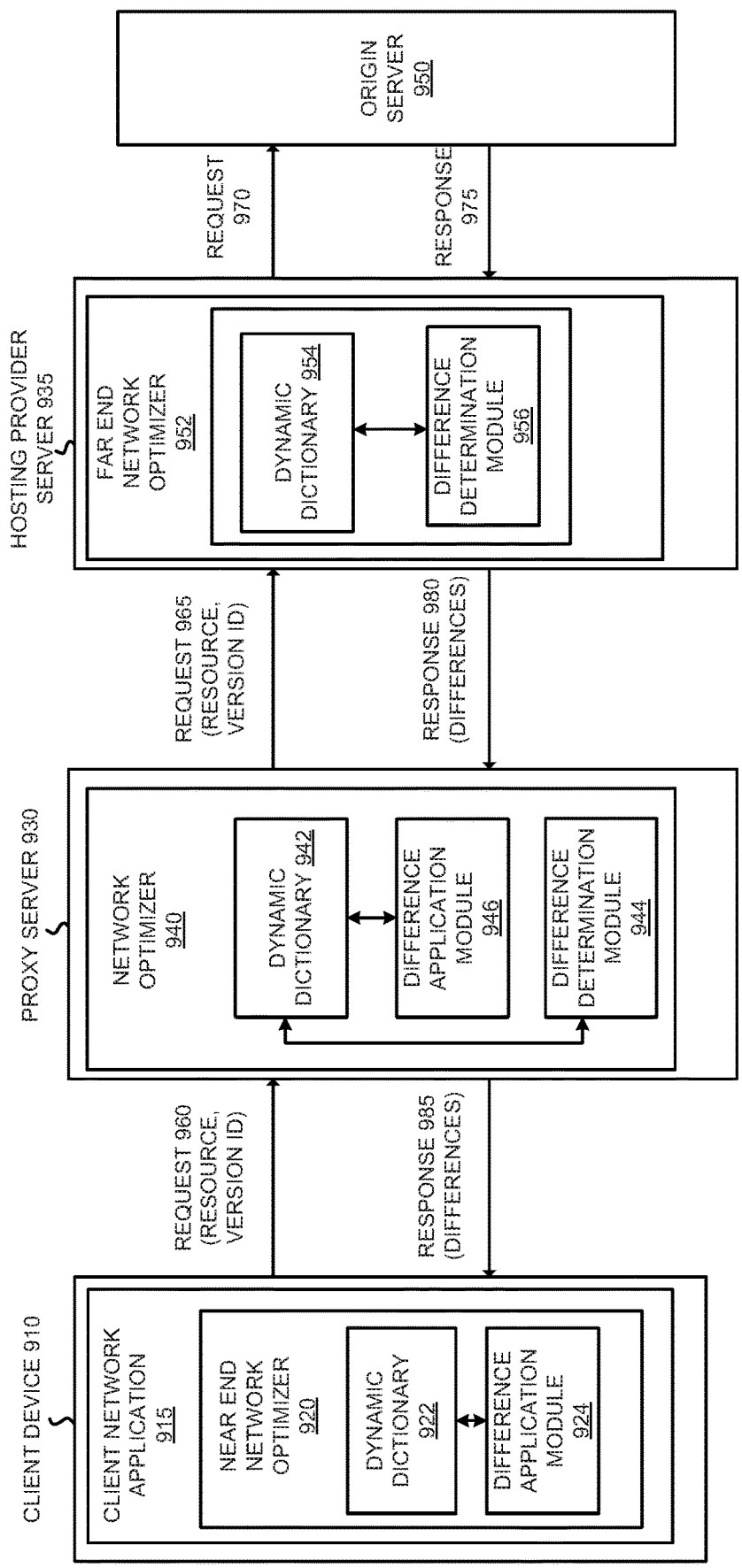
FIG. 9 illustrates an alternative embodiment where a client network application of the client device includes a near end network optimizer according to one embodiment.

FIG. 9 illustrates another embodiment where the client network application 915 of the client device 910 includes the near end network optimizer 920 that performs similar operations as the near end network optimizers previously described herein. For example, the near end network optimizer 920 includes the dynamic dictionary 922, which is similar to the dynamic dictionary 124 and stores version(s) of resources and optionally version identifier(s). The near end network optimizer 920 also includes the difference application module 924, which operates in a similar way as the difference application module 132.

Unlike FIG. 8, FIG. 9 illustrates a proxy server 930 that includes functionality of a far end network optimizer (with respect to the client device 910) and of a near end network optimizer (with respect to the hosting provider server 935). The proxy server 930 includes the dynamic dictionary 942, which is similar to the dynamic dictionary 144 and stores version(s) of resources and optionally version identifier(s).

The client device 910 transmits requests for network resources of the origin server 950 to the proxy server 930 and receives responses from the proxy server 930. In one embodiment, requests (e.g., HTTP requests) are received at the proxy server 930 as a result of a DNS request for the domain of the origin server 950 resolving to the proxy server 930 in a similar was as described with reference to FIG. 8. For example, upon determining to transmit a request for a network resource that is stored in the dynamic dictionary 922 (e.g., as a result of the network resource being set as "no-cache", the cached version of the network resource in the cache of the client network application 915 being expired, etc.), the client network application 915 transmits a request 960 for the resource, along with the version identifier of the last known version of that resource to the proxy server 930.

The network optimizer 940 receives the request and determines whether it has access to the identified version of the network resource. Assuming that it does, the network optimizer 940 retrieves the most current version of the resource. As illustrated in FIG. 9, the proxy server 930 transmits the request 965 to the hosting provider server 935, along with a version identifier of the resource. In one embodiment, the version identifier included in the request 965 is the same version identifier as included in the request 960. In other embodiments, the version identifier included in the request 965 is the version identifier of the most recent network resource stored in the dynamic dictionary 942, which may or may not correspond with the version identifier included in the request 960.

The far end network optimizer 952 receives the request and determines whether it has access to the identified version of the network resource (as identified by the version identifier in the request 965). Assuming that it does, the far end network optimizer 952 retrieves the most current version of the resource. As illustrated in FIG. 9, the hosting provider server 935 transmits the request 970 to the origin server 950 for the requested resource in order to retrieve the most current version of the resource. The hosting provider server 935 receives the response 975, which includes the requested resource.

The difference determination module 956 of the far end network optimizer 952 receives the requested resource and determines the differences between the versions of the resource as previously described. The far end network optimizer 952 causes the response 980 to be transmitted to the proxy server 930 that identifies the differences between the versions. The response 980 does not include the entire network resource. The response 980 may also include a version identifier in some embodiments. The far end network optimizer 952 updates its dynamic dictionary 956 with the most current version of the resource and may store the differences in the dynamic dictionary 956 and remove old versions of the resource.

Responsive to receiving the differences, the difference application module 946 applies the difference to its previous version (identified in the request 965) to generate the most current version of the resource. The difference determination module 944 may also determine the difference between the most current version of the resource, and the version identified in the request 960 if the version identified in the request 960 is different than that of the version identified in the request 965. The network optimizer 940 causes the response 985 to be transmitted to the client network application 915 that identifies the differences between the latest version of the resource and the version identified in the request 960. The response 985 may also include a version identifier in some embodiments. The network optimizer 940 updates its dynamic dictionary 942 with the most current version of the resource and may store the differences in the dynamic dictionary 942 and remove old versions of the resource.

Responsive to receiving the differences, the difference application module 924 applies the differences to its previous version to generate the most current version of the resource. The most current version may then be displayed by the client network application 915. The near end network optimizer 920 also updates its dynamic dictionary 922 with the updated version of the resource.

Figure 10:
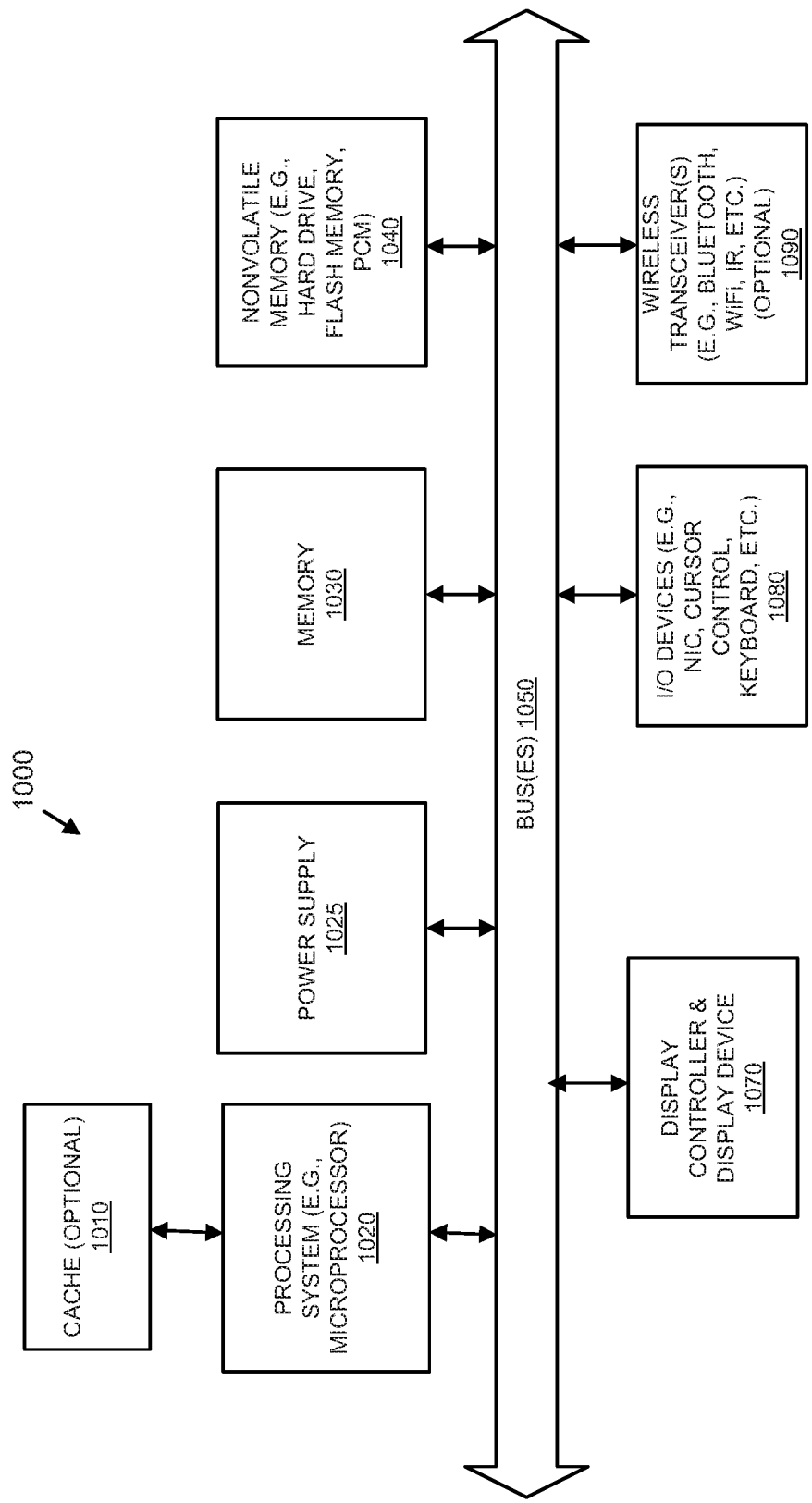
FIG. 10 illustrates an exemplary computer system which may be used in embodiments.

As illustrated in FIG. 10, the computer system 1000, which is a form of a data processing system, includes the bus(es) 1050 which is coupled with the processing system 1020, power supply 1025, memory 1030, and the nonvolatile memory 1040 (e.g., a hard drive, flash memory, Phase-Change Memory (PCM), etc.). The bus(es) 1050 may be connected to each other through various bridges, controllers, and/or adapters as is well known in the art. The processing system 1020 may retrieve instruction(s) from the memory 1030 and/or the nonvolatile memory 1040, and execute the instructions to perform operations described herein. The bus 1050 interconnects the above components together and also interconnects those components to the display controller & display device 1070, Input/Output devices 1080 (e.g., NIC (Network Interface Card), a cursor control (e.g., mouse, touchscreen, touchpad, etc.), a keyboard, etc.), and the optional wireless transceiver(s) 1090 (e.g., Bluetooth, WiFi, Infrared, etc.). In one embodiment, the client devices 110, the server including the near end network optimizer 120, the server including the far end network optimizer 140, and/or origin servers, can take the form of the computer system 1000.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While embodiments described herein refer to a single near end network optimizer coupled with a single far end network optimizer, embodiments are not so limited. For example, in some embodiments, multiple near end network optimizers are coupled with a single far end network optimizer. In such embodiments, the far end network optimizer may use the same dynamic dictionary for all of the near end network optimizers in some implementations, and in other implementations may use a separate dynamic dictionary for each separate near end network optimizer.

In some embodiments there may be multiple pairs of near end network optimizers and far end network optimizers between a client computing device and the origin server. For example, in such embodiments, a device implementing a far end network optimizer may also be acting as a near end network optimizer for another far end network optimizer.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a far end network optimizer of a proxy server, of supporting a delta compression technique for reducing network resource transmission size, the method comprising:
   receiving, from a near end network optimizer, a first HyperText Transfer Protocol (HTTP) request for a network resource on behalf of a client device;
   in response to receiving the first HTTP request,
      retrieving the requested network resource from an origin server that hosts the network resource,
      transmitting, to the near end network optimizer, a first HTTP response including the retrieved network resource, and
      storing the retrieved network resource as a first version of the requested network resource, regardless of a directive associated with the network resource that a cached version of the network resource is not to be used to respond to a future HTTP request for that network resource without successful revalidation with the origin server;
   receiving, from the near end network optimizer, a second HTTP request for the network resource on behalf of the client device; and
   in response to receiving the second HTTP request for the network resource,
      retrieving a most current version of the network resource from the origin server,
      transmitting, to the near end network optimizer, a second HTTP response including a set of one or more differences between the first version and the most current version of the network resource without transmitting the entire network resource, wherein transmitting the second HTTP response causes the near end network optimizer to transmit to the client device an updated version of the network resource that is generated by applying the set of differences to the first version of the network resource.

2. The method of claim 1, further comprising:
   storing, in the far end network optimizer, a first version identifier identifying the first version of the network resource.

3. The method of claim 2, wherein the retrieving the requested network resource from the origin server includes:
   transmitting, to the origin server, a third HTTP request for the network resource; and
   receiving, from the origin server, a third HTTP response including the first version of the network resource and the first version identifier, wherein the first version identifier is set by the origin server.

4. The method of claim 3, wherein the first version identifier is a value of a last modified header or a value of an HTTP entity tag (ETag) header field.

5. The method of claim 2, further comprising:
   generating the first version identifier by hashing the first version of the network resource.

6. The method of claim 2, wherein the first version of the network resource and the first version identifier associated with the first version of the network resource are stored in a dynamic dictionary of the far end network optimizer.

7. The method of claim 2, wherein the first HTTP response includes the first version identifier.

8. The method of claim 7, wherein the second HTTP request for the network resource includes the first version identifier associated with the first version of the network resource.

9. The method of claim 1, wherein the second HTTP response further includes an indication that the second HTTP response contains the set of differences between versions and not the entire network resource.

10. A non-transitory machine-readable storage medium that provides instructions that, when executed by a processor of a proxy server including a far end network optimizer for supporting a delta compression technique for reducing network resource transmission size, cause said processor to perform operations comprising:
    receiving, from a near end network optimizer, a first HyperText Transfer Protocol (HTTP) request for a network resource on behalf of a client device;
    in response to receiving the first HTTP request,
       retrieving the requested network resource from an origin server that hosts the network resource,
       transmitting, to the near end network optimizer, a first HTTP response including the retrieved network resource, and
       storing the retrieved network resource as a first version of the requested network resource, regardless of a directive associated with the network resource that a cached version of the network resource is not to be used to respond to a future HTTP request for that network resource without successful revalidation with the origin server;
    receiving, from the near end network optimizer, a second HTTP request for the network resource on behalf of the client device; and
    in response to receiving the second HTTP request for the network resource,
       retrieving a most current version of the network resource from the origin server,
       transmitting, to the near end network optimizer, a second HTTP response including a set of one or more differences between the first version and the most current version of the network resource without transmitting the entire network resource, wherein transmitting the second HTTP response causes the near end network optimizer to transmit to the client device an updated version of the network resource that is generated by applying the set of differences to the first version of the network resource.

11. The non-transitory machine-readable storage medium of claim 10, further comprising:
    storing, in the far end network optimizer, a first version identifier identifying the first version of the network resource.

12. The non-transitory machine-readable storage medium of claim 11, wherein the retrieving the requested network resource from the origin server includes:
    transmitting, to the origin server, a third HTTP request for the network resource; and
    receiving, from the origin server, a third HTTP response including the first version of the network resource and the first version identifier, wherein the first version identifier is set by the origin server.

13. The non-transitory machine-readable storage medium of claim 12, wherein the first version identifier is a value of a last modified header or a value of an HTTP entity tag (ETag) header field.

14. The non-transitory machine-readable storage medium of claim 11, further comprising:
   generating the first version identifier by hashing the first version of the network resource.

15. The non-transitory machine-readable storage medium of claim 11, wherein the first version of the network resource and the first version identifier associated with the first version of the network resource are stored in a dynamic dictionary of the far end network optimizer.

16. The non-transitory machine-readable storage medium of claim 11, wherein the first HTTP response includes the first version identifier.

17. The non-transitory machine-readable storage medium of claim 16, wherein the second HTTP request for the network resource includes the first version identifier associated with the first version of the network resource.

18. The non-transitory machine-readable storage medium of claim 10, wherein the second HTTP response further includes an indication that the second HTTP response contains the set of differences between versions and not the entire network resource.

\* \* \* \* \*